United States Patent Office 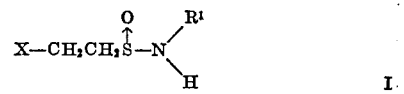

3,830,838
Patented Aug. 20, 1974

3,830,838
ETHANESULFINAMIDES
Willy D. Kollmeyer, Kurt H. G. Pilgram, and Earl K. Jackson, Modesto, Calif., assignors to Shell Oil Company
No Drawing. Continuation-in-part of abandoned application Ser. No. 162,710, July 14, 1971. This application May 15, 1972, Ser. No. 253,355
Int. Cl. C07c 145/00
U.S. Cl. 260—551 S                                   5 Claims

ABSTRACT OF THE DISCLOSURE

Certain novel beta substituted ethanesulfinamides are described, with their preparation and use as plant growth regulators.

---

This application is a continuation-in-part of Ser. No. 162,710, filed July 14, 1971, now abandoned.

BACKGROUND OF THE INVENTION

Field of the Invention

This invention relates to a novel class of ethanesulfinamides substituted on the beta carbon atom of the ethane moiety with certain electronegative groups. These novel compounds exhibit a wide variety of useful plant growth regulatory properties.

Description of the Prior Art

No art is known which anticipates the beta substituted ethanesulfinamides of this invention. The most pertinent of the prior art known appears to be German Pat. 2,005,514 which discloses lower alkyl esters of 2-chloro or bromoethanesulfinic acids which are useful as anticancer agents. Other related art includes U.S. Pat. 3,463,803 which discloses certain polyhaloethylsulfinate esters which are useful as pesticides, defoliants and dessicants and U.S. Pat. 2,412,909 which discloses a general reaction wherein unspecified alkyl or substituted alkyl sulfinyl halides may be reacted with amines, phenols, etc., to form products which are useful as bleaching or reducing agents, dyes, plasticizers and a variety of other uses, but not including plant growth regulation.

SUMMARY OF THE INVENTION

A new series of ethanesulfinamides wherein the amide nitrogen is unsubstituted or monosubstituted and the beta carbon of the ethane moiety is substituted with certain electronegative groups, has been discovered. These novel sulfinamides are useful for modifying and/or regulating the growth of plants. Depending on variables such as the species of plant treated, plant maturity at time of treatment, the quantity and concentration of growth regulant used, the specific compound used, and the formulation employed, the compounds of the invention have exhibited a wide variety of useful plant growth regulating properties. Some of the plant growth regulant effects which have been observed from the use of the compounds of the present invention include the promotion of early and more uniform fruit ripening and/or abscission, acceleration of leaf abscission, promotion of flowering, stimulation of sprouting of tubers, reduction of plant height, destruction of apical dominance in tubers causing lateral buds to sprout, stimulation of seed germination, increased formation of root initials on tomato stems and the causation of tomato leaf epinasty. It will be recognized that chemical agents possessing biological properties such as those described for the compounds of this invention can be valuable aids to the agricultural industry in increasing crop productivity, while at the same time reducing the labor and expense necessary to produce the crops.

The invention, accordingly, is a new class of beta substituted ethanesulfinamides hereinbefore described, their use as plant growth regulators and formulations containing them which are useful to regulate the growth of plants.

DESCRIPTION OF THE PREFERRED EMBODIMENTS

The novel compounds of this invention can be represented by the general formula I:

$$X-CH_2CH_2\overset{O}{\underset{\uparrow}{S}}-N\overset{R^1}{\underset{H}{\diagdown}} \qquad I.$$

wherein $R^1$ represents hydrogen, alkyl of up to 20 carbon atoms, aralkyl of up to 10 carbon atoms, alkenyl of up to 8 carbon atoms, cycloalkyl of up to 8 carbon atoms, alkoxy of up to 4 carbon atoms, the group represented by $R_2Y$ in which $R^2$ is alkylene of up to 4 carbon atoms and Y is hydroxy or alkylthio of up to 3 carbon atoms or phenyl or a substituted phenyl of the formula

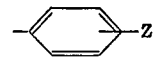

in which Z is alkyl of up to 3 carbon atoms, alkylthio of up to 3 carbon atoms, alkoxy of up to 3 carbon atoms, alkylsulfonyl of up to 3 carbon atoms, chlorine, bromine, nitro or trifluoromethyl; and wherein X is chlorine, bromine or alkylsulfonyloxy wherein the alkyl group contains up to 3 carbon atoms with the proviso that when X is alkylsulfonyloxy $R^1$ is hydrogen, alkyl of up to 6 carbon atoms or phenyl. Any of these alkyl groups can be of either straight chain or branched chain configuration.

Exemplary species of the class of the invention include:

2-bromo-N-(3-hydroxypropyl)ethanesulfinamide
2-bromo-N-octylethanesulfinamide
2-bromo-N-benzylethanesulfinamide
2-chloro-N-heptylethanesulfinamide
2-bromo-alpha, alpha, alpha-trifluoroethanesulfin-3-toluidide
2-(ethylsulfonyloxy)ethanesulfinamide
2-chloro-2'-(methylthio)ethanesulfinanilide
2-chloro-3'-(ethylsulfonyl)ethanesulfinanilide
2-chloro-2'-bromoethanesulfinanilide
2-bromo-N-methoxyethanesulfinamide
2-bromo-N-(3-butenyl)ethanesulfinamide
2-chloro-N-propoxyethanesulfinamide
2-bromo-2'-chloroethanesulfinanilide The highest plant growth regulator activity appears to be associated with those compounds according to formula I wherein X is chlorine or bromine. Preferred species of this subclass include compounds wherein X is chlorine and $R^1$ is hydrogen, alkyl of up to 8 carbon atoms, cycloalkyl of up to 6 carbon atoms, alkenyl of up to 5 carbon atoms, aralkyl of up to 8 carbon atoms, unsubstituted phenyl, or phenyl substituted with chlorine, bromine or trifluoromethyl.

Specific examples of this preferred subclass include:

2-chloro-N-heptylethanesulfinamide
N-amyl-2-chloroethanesulfinamide
N-(2-butenyl)-2-chloroethanesulfinamide
N-(2-pentenyl)-2-chloroethanesulfinamide
2-chloroethanesulfin-4-toluidide
N-phenethyl-2-chloroethanesulfinamide The compounds of the invention may be applied to seeds prior to planting or to soil surrounding the plants or to plants pre-emergence, post-emergence or at harvest to modify and/or regulate the growth of the plant, or optionally, may be applied to stimulate, regulate and/or modify ripening of the harvested portion. For application, the compounds of the invention being either solid or liquid at ambient temperatures, may be formulated using conventional techniques and employing adjuvants and/or modifiers which are known in the agricultural chemical art to provide compositions in the form of wettable powders, dusts, granules, pellets, solutions, emulsifiable concentrates, emulsions and pastes.

Preferred for use on maturing plants or harvested crop would be those formulations which furnish the active ingredient to the plant locus in liquid or paste form. These preferred formulations would include wettable powders, solutions, emulsifiable concentrates, emulsions and pastes. Wettable powders are water-dispersible compositions containing the active ingredient in proportions ranging from 10 to 90% of the total composition, and an inert solid carrier such as one of the natural clays or a synthetic mineral filler derived from silica and silicate. Optionally such wettable powder may also contain 3–10% of a dispersing agent and where necessary 0–10% of stabilizer(s) and/or other additives such as penetrants or stickers. The term solution includes both aqueous and non-aqueous solutions of the compounds of the invention. Certain of the compounds of the invention are soluble in aqueous media and can be formulated and applied in aqueous solution at concentrations up to 10%. Other compounds of the invention are less or sparingly soluble in water and exhibit proportionally higher solubility in non-aqueous organic media. These compounds can be formulated and applied in non-aqueous solution at concentrations of up to 50%. The emulsifiable concentrates contemplated for use in the method of the invention usually contain, in addition to the solvent and, when necessary, co-solvent, 10–50% w./v. active ingredient, 2–20% w./v. emulsifiers and 0–20% of appropriate additives such as stabilizers, penetrants and corrosion inhibitors. Pastes are compounded so as to obtain a stable flowable product and usually contain 10–60% active ingredient, 2–20% of appropriate additives and, as carrier, water or an organic liquid in which the plant growth regulator is substantially insoluble.

For season long treatment, i.e., application at time of planting or application to plants in early stages of growth, or for other specialized applications, solid formulations of the compounds of the invention may be desired. Suitable solid formulations would include dusts, granules and pellets. Dusts usually have a composition similar to that of a wettable powder but without a dispersant, and normally contain ½ to 10% plant growth regulator. Dust may also be formulated as concentrates which are then usually diluted further with solid carried in suitable blending equipment prior to use in the field. Granules and pellets are usually prepared to have a size between 10 and 100 BS mesh, and may be manufactured by agglomeration compaction or impregnation techniques. Generally, granules will contain ½ to 25% of plant growth regulator plus additives such as stabilizers, slow-release modifiers, binding agents, etc. Except where indicated otherwise, all percentages given in this and the preceding paragraphs are percentages by weight.

To achieve the plant growth regulating and modifying effects hereinbefore described, formulations of the compounds of the invention may be applied directly to the plant fruit or as foliar-soil treatments, seed treatments, foliar treatments or soil treatments. The rate of application will be dependent on the type of application technique utilized as well as other factors such as the particular active agent used, the particular species of plants involved, the maturity stage of the plant, the types of effect desired and the local conditions; for example, temperature, humidity, soil moisture, chemical makeup of the soil and the like. In general, for plants in aggronomic environment, rates from 0.05 to 20 pounds per acre can be used to stimulate and/or modify plant growth. However, the preferred rates for most uses range between 0.1 and 5.0 pounds per acre. For application to the plant fruit or harvested crop, the rate of application may range between 1 and 20,000 p.p.m. (parts per million based on total fruit weight) with rates of from 100 to 4000 p.p.m. being preferred.

The beta substituted ethanesulfinamides of formula I wherein the amide nitrogen is unsubstituted may be prepared by the reaction of a beta substituted ethanesulfinyl chloride of formula II

$$X-CH_2CH_2-\overset{O}{\underset{}{S}}-Cl \qquad \qquad II$$

wherein X is as defined in formula I above, with anhydrous ammonia. The reaction is suitably carried out under an inert atmosphere such as nitrogen and in a water-free solvent such as anhydrous ether. It has been found convenient to add the sulfinyl chloride dropwise to a solution of ammonia in anhydrous ether, maintaining the solution at −10 to −40° C. during the addition period. Under this procedure the reaction is normally complete in the time required for addition of the sulfinyl chloride reactant plus the time required to warm the reaction mass to ambient temperatures by natural convection.

In an analogous manner, the N-monosubstituted ethanesulfinamides of formula I may be prepared by the reaction of a sulfinyl chloride described by formula II above with a primary amine of formula III

$$H_2-N-R^1 \qquad \qquad III$$

wherein $R^1$ represents any of the moieties described for $R^1$ in formula I above. This reaction is run analogously to the unsubstituted amide preparation described above utilizing the same reaction techniques and parameters.

The beta substituted ethanesulfinyl chlorides described by formula II can be prepared by oxidative chlorination of the corresponding bis(beta substituted ethyl) disulfide wherein the beta substituents of the disulfide are the same as the beta substituent on the sulfinyl chloride. This technique, which utilizes the general method described by I. B. Douglass and R. V. Norton, *Journal of Organic Chemistry*, 33, 2104 (1968) for conversion of certain disulfides to sulfinyl chlorides, involves the reaction of chlorine gas with the bis(beta-substituted-ethyl) disulfide in glacial acetic acid.

The specific bis(beta-substituted-ethyl) disulfide reactants utilized in the synthesis technique described above are either known in the art, or may be prepared by techniques which are well known in the art. The bis(beta-substituted ethyl) disulfides wherein the beta substituent is chlorine or bromine are described in G. Y. Epshtein et al., *J. Gen. Chem. USSR*, 34, 1961 (1964), see also, Fuson et al., *J. Org. Chem. 11*, 491 (1946). The bis(beta substituted ethyl) disulfides wherein the beta substituent is alkylsulfonyloxy may be prepared by reacting the appropriate alkylsulfonyl chloride with bis(2-hydroxyethyl) disulfide in an inert organic solvent such as ether or methylene chloride. This latter reaction is suitably carried out in the presence of a base such as pyridine or triethylamine which serves as an acceptor of the byproduct hydrogen chloride which is generated by the reaction. Bis(2-hydroxyethyl) disulfide, which is described in G. M. Bennett, *J. Chem. Soc., 119*, 418 (1921), may be prepared by the reaction of 2-mercaptoethanol with hydrogen peroxide at elevated temperatures.

The following examples are illustrative of methods of preparing the compounds of this invention and their use in regulating plant growth. In these examples, parts by weight (w.) and parts by volume (v.) bear the same relation as the kilogram to the liter and all temperatures are in degrees centigrade. In all cases, the compound structures were confirmed by infrared spectra, nuclear magnetic resonance spectra, and elemental analyses.

Example I.—2-chloroethanesulfinamide

Bis(2-chloroethyl)disulfide was oxidatively chlorinated according to the general method disclosed in I. B. Douglass and R. V. Norton, *Journal of Organic Chemistry, 33,* 2104 (1968) as follows: bis(2-chloroethyl)disulfide (38.0 w.) was charged into a reaction vessel containing glacial acetic acid (24.0 w.) and the mixture was cooled to 10°. Chlorine gas was introduced to the cooled solution at a rate such that the reaction mixture was maintained at about 10°. The chlorine addition was continued until the deep orange color of the reaction mixture disappeared. The solution was then distilled at reduced pressure to yield a clear liquid, 2-chloroethanesulfinyl chloride (50.4 w.) boiling point 82–84° under reduced pressure (12 torr).

2-chloroethanesulfinyl chloride (22 w.) was added dropwise in a stirred solution of anhydrous ammonia (5.1 w.) in dry ether (150 v.) which was maintained at −40° under a nitrogen atmosphere. The mixture was warmed to ambient temperature and filtered. The filtrate was then evaporated to dryness by distillation in a vacuum. The residue obtained from evaporation of the filtrate and the filter cake were both extracted with dry acetone. The extracts were combined and the solvent was removed by distillation in a vacuum. Recrystallization of the residue from dry acetone yielded a white solid, 2-chloroethanesulfinamide (7.2 w.) melting at 78–80°.

Example II.—2-chloroethanesulfinanilide 2-chloroethanesulfinyl chloride (29.4 w.) prepared as in Example I was added dropwise to a stirred solution of freshly distilled aniline (37.2 w.) in dry ether (400 v.). The addition was carried out under a nitrogen atmosphere and the reaction mixture was maintained at −10 to 0°. Upon completion of the addition the reaction mixture was warmed to ambient temperature and filtered. Evaporation of the filtrate by distillation in a vacuum gave a white solid which was recrystallized from toluene-hexane to yield 2-chloroethanesulfinanilide (21.0 w.) melting at 78–80°.

Example III.—N-benzyl-2-chloroethanesulfinamide 2-chloroethanesulfinyl chloride (7.4 w.) prepared as in Example I was added dropwise to a solution of benzylamine (10.7 w.) in dry ether (130 v.). The addition was carried out under a nitrogen atmosphere and the reaction mixture was maintained at −10° to 0°. Upon completion of the addition the reaction mixture was warmed to ambient temperature and filtered. Evaporation of the filtrate by distillation in a vacuum gave a solid residue which was recrystallized from toluene-hexane to yield N-benzyl-2-chloroethanesulfinamide (6.0 w.) melting at 54–55°.

Example IV.—2-chloro-N-(2-hydroxyethyl)ethanesulfinamide

A stirred solution of 2-aminoethanol (12.2 w.) in dry ether (300 v.) was cooled to −5° and treated dropwise with 2-chloroethanesulfinyl chloride (14.7 g.), prepared as in Example I, under a nitrogen atmosphere. After warming to ambient temperature, the reaction mixture was filtered and the filtrate was concentrated by distillation in a vacuum. The residue was purified through a wiped film molecular still to yield 2-chloro-N-(2-hydroxyethyl)ethanesulfinamide (1.9 w.) boiling at 160° under reduced pressure ($1 \times 10^{-4}$ torr).

Example V.—2-chloro-N-(2-ethylthioethyl)ethanesulfinamide 2-chloroethanesulfinyl chloride (3.7 w.), prepared as in Example I, in dry ether (50 v.) was added with stirring to freshly distilled 2-aminoethyl ethyl sulfide (5.3 w.) in dry ether (100 v.) under a nitrogen atmosphere. The reaction mass was held at −35° during the addition period. Upon completion of this addition the reaction mixture was warmed to ambient temperature and filtered. The solvent was removed from the filtrate by distillation under high vacuum at ambient temperature to yield 2-chloro-N-(2-ethylthioethyl)ethanesulfinamide (4.0 w.).

Example VI.—2-(methylsulfinyloxy)ethanesulfinamide

Bis(2-hydroxyethyl) disulfide was prepared by adding dropwise 30% hydrogen peroxide (503 w.) over 2 hours to 2-mercaptoethanol (624 w.) maintained at 55–60°. Upon cooling, the reaction mixture was stirred for about 16 hours at ambient temperatures. The crude product (577 w.) was isolated by removing water at 100° and 20 torr.

Crude bis(2-hydroxyethyl) disulfide (30.8 w.) prepared as above, and triethylamine (40.4 w.) were dissolved in methylene chloride (400 v.). Methanesulfonyl chloride (45.8 w.) in methylene chloride (60 v.) was then added dropwise under an inert atmosphere. The exothermic reaction was moderated by external cooling and the reaction mixture was maintained at 20–25°. The reaction mixture, after standing at ambient temperature for about 48 hours, was filtered. The methylene chloride filtrate solution was washed with water, dried over magnesium sulfate, and evaporated at reduced pressure to provide bis(2-methylsulfonyloxy)disulfide (39.0 w.) as an oil.

The crude bis(2-(methylsulfonyloxy)ethyl) disulfide oil, as prepared above, was oxidatively chlorinated according to the general method disclosed in I.B. Douglass and R. V. Norton, *Journal of Organic Chemistry,* 33, 2104 (1968) using the experimental procedure disclosed in Example I above except the product was not distilled, but rather the volatile impurities were removed by evaporation under reduced pressure at ambient temperatures to yield 2-(methylsulfonyloxy)ethanesulfinyl chloride as an oil.

A stirred solution of anhydrous ammonia (1.7 w.) in methylene chloride (200 v.) at −20° was treated dropwise with 2-(methylsulfonyloxy)ethanesulfinyl chloride, (10.3 w.), prepared as above, under a nitrogen atmosphere. After warming to room temperature, the reaction mixture was evaporated in a vacuum. The residue was extracted with dry acetone. Concentration of the acetone extract gave an amber oil which crystallized upon standing. Recrystallization from methyene chloride-petroleum ether gave a light tan solid, 2-(methylsulfonyloxy)ethanesulfinamide (2.0 w.) melting at 64–65°.

Example VII

Following procedures similar to those given in examples on preparation techniques described earlier, the following other species of the compounds of the invention were prepared (symbols refer to formula I).

TABLE I $$X-CH_2CH_2\overset{O}{\underset{}{S}}-N\diagdown_{H}^{R^1} \quad (I)$$

| X | R¹ | Melting point, °C. or boiling point, °C. (torr) |
|---|---|---|
| Cl | CH₃ | 85(2×10⁻⁴) |
| Cl | C₂H₅ | 95–100(1×10⁻⁴) |
| Cl | CH(CH₃)₂ | 90–100(1×10⁻⁴) |
| Cl | —C(CH₃)₃ | 67–69 |
| Cl | —CH(CH₃)(C₂H₅) | 50(1×10⁻⁴) |
| Cl | —CH₂(CH₂)₂CH₃ | 100(1×10⁻⁴) |
| Cl | —CH₂(CH₂)₄CH₃ | 100(1×10⁻⁴) |
| Cl | —CH₂(CH₂)₆CH₃ | 100(2×10⁻⁴) |
| Cl | (cyclohexyl) | 100(2×10⁻⁴) |
| Cl | (phenyl) | 78–80 |
| Cl | (2-chlorophenyl) | 63–65 |

See footnote at end of table.

TABLE 1—Continued

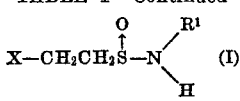

| X | R¹ | Melting point, °C. or boiling point, °C. (torr) |
|---|---|---|
| Cl | -⟨Cl⟩ (2-Cl phenyl) | 70-72 |
| Cl | -⟨⟩-Cl (4-Cl phenyl) | 113-114 |
| Cl | -⟨⟩CF₃ | 80-85 |
| Cl | -⟨⟩CH₃ | 91-92.5 |
| Cl | -⟨⟩-OCH₃ | 95-96 |
| Cl | —CH₂(CH₂)₁₀CH₃ | ¹ 85-100 |
| Cl | —CH₂(CH₂)₁₄CH₃ | ¹ 90-105 |
| Cl | —CH₂CH=CH₂ | 85-95(1×10⁻⁴) |
| Cl | CH₂-⟨⟩ | 54-55 |
| Br | -⟨⟩ | 92-94 |
| Br | CH₂(CH₂)₄CH₃ | 25 |
| Cl | OCH₃ | 85-90(1×10⁻⁴) |
| CH₃S(O)₂—O— | -⟨⟩ | 82-84 |

¹ Decomposition.

Example VIII.—Fruit abscission

Washington navel oranges were harvested in a manner such that the fruit was still attached to about 4 inches of stem having two clusters of leaves. The pull force required to cause abscission of the fruit from the cut stems was 14–16 pounds. The harvested oranges were then segregated into groups of five oranges (stems and leaves still attached) and the segregated groups were sprayed to dripping with several concentrations of 2 - chloroethanesulfinanilide in aqueous solution. A water treatment was used as control. Some oranges began to drop off the stems two days after treatment with the higher concentrations of 2 - chloroethanesulfinanilide while the fruit in the control groups remained attached to the stems. The rates of application as well as the observations of the fruit abscission occurring seven days after treatment for both the treatment groups and the control groups are recorded in Table II below.

TABLE II

| Treatment | Spray concentration (p.p.m.) | Number of oranges separated from stems |
|---|---|---|
| Water | | 2 |
| 2-chloroethanesulfinanilide | 4,000 | 4 |
| Do | 2,000 | 5 |
| Do | 1,000 | 4 |

Example IX.—Leaf abscission

Individual branches of Washington navel orange trees were treated with aqueous solutions of several of the compounds of the invention. Each of the compounds tested was made up as a 2000 p.p.m. solution in water containing 0.2% tronic surfactant. A total of 100 ml. of each of the resulting solutions was applied as a foliar spray to a single branch of Washington navel orange trees. Seven days after treatment some of the leaves on the treated branches became stiff, although still green, and began to fall from the trees. Observations of the defoliation caused by each chemical six weeks after treatment are recorded in the following table. Evaluation of defoliation was based on four classifications: 1 to 10%, 11 to 30%, 31 to 60% and 61 to 100% abscission of the leaves originally present.

TABLE III

| Compound tested: | Percent abscission |
|---|---|
| Control | 0 to 2 |
| N-methyl-2-chloroethanesulfinamide | 31 to 60 |
| N-ethyl-2-chloroethanesulfinamide | 61 to 100 |
| N-isopropyl-2-chloroethanesulfinamide | 61 to 100 |
| N-tert-butyl-2-chloroethanesulfinamide | 11 to 30 |
| N-sec-butyl-2-chloroethanesulfinamide | 11 to 30 |
| N-butyl-2-chloroethanesulfinamide | 61 to 100 |
| N-hexyl-2-chloroethanesulfinamide | 61 to 100 |
| N-octyl-2-chloroethanesulfinamide | 61 to 100 |
| N-benzyl-2-chloroethanesulfinamide | 31 to 60 |
| N-cyclohexyl-2-chloroethanesulfinamide | 61 to 100 |
| N-2-chloroethanesulfinanilide | 11 to 30 |
| 2,2'-dichloroethanesulfinanilide | 1 to 10 |
| 2,3'-dichloroethanesulfinanilide | 11 to 30 |
| 2,4'-dichloroethanesulfinanilide | 1 to 10 |
| 2 - chloro - α,α,α trifluoroethanesulfin-3-toluidide | 1 to 10 |
| 2-chloroethanesulfinamide | 31 to 60 |

Example X.—Fruit ripening

Picked, green untreated bananas were separated and randomly grouped for treatment. The treatment consisted of spraying each of the different treatment groups, one untreated group being retained as a control, with a 1000 p.p.m. aqueous solution of one of the following compounds of the invention: 2 - chloroethanesulfinanilide, 2,2' - dichloroethanesulfinanilide, 2 - chloroethanesulfinamide and N - hexyl - 2 - chloroethanesulfinamide. In all cases the treated bananas turned completely yellow two or five days before the untreated bananas.

Example XI.—Stimulation of tuber sprouting

Twenty-four yellow nutsedge tubers were soaked in a 100 p.p.m. aqueous solution of 2-chloroethanesulfinanilide for ten minutes, blotted dry and sealed in a bottle. A like number of tubers were soaked in water and sealed according to the same procedure. Three days after treatment all (100%) of the treated tubers had sprouted whereas only 78% of the control tubers had sprouted. Also, the number of shoots formed per tuber increased from 1.3 for the control group to 1.5 for the treatment group.

Example XII.—Fruit ripening

Mature, green cherry tomatoes were harvested from plants grown in a greenhouse. The fruit was randomized into treatment groups and a control group and the treatment groups were sprayed with 20 ml. of a 100 p.p.m. aqueous solution of several of the compounds of the invention. The tomatoes in each group were rated periodically by visual observation for ripeness. The results four days after treatment are recorded in Table IV.

TABLE IV

| Treatment | Number of fruit | | |
|---|---|---|---|
| | Green | Colored | Ripe |
| Control | 34 | 0 | 4 |
| 2-chloroethanesulfinanilide | 18 | 7 | 12 |
| N-hexyl-2-chloroethanesulfinamide | 17 | 14 | 7 |
| 2-chloroethanesulfinamide | 7 | 23 | 5 |
| 2,2'-dichloroethanesulfinanilide | 18 | 11 | 5 |

Example XIII.—Fruit ripening

Mature tomato plants, variety UF 145–21–4, in a 4 x 10 foot plot were sprayed to run off with an aqueous solution containing as an active ingredient, 1000 p.p.m. of 2 - chloroethanesulfinanilide and as adjuvants, 1% acetone, 0.2% tronic and 10% propylene glycol. For control purposes another plot of like size in the same field was sprayed to run off with the spray solution not containing the active ingredient. Some damage to the foliage occurred with both the control spray and the treatment spray. Thirteen days after treatment the tomatoes were harvested from the sprayed plots as well as from an unsprayed plot maintained for additional control purposes. Immediately after picking, the tomatoes from each plot were sorted into green, pink and red fruit. The observations as to the percent by weight of ripe (red) fruit in the plots are recorded in Table V below.

TABLE V

| Treatment | Percent Red fruit in plots | Difference |
|---|---|---|
| Sprayed control | 40.0 | |
| Unsprayed control | 39.5 | −0.5 |
| 2-chloroethanesulfinanilide | 66.8 | +26.8 |

Example XIV.—Fruit ripening

A second experiment was conducted to evaluate the efficacy of the compounds of the invention in ripening green harvested tomatoes. In this experiment green mature tomatoes were picked from plants grown in a greenhouse and randomly segregated into groups of 10 each for treatment. The treatment chemicals were made up in water/acetone solutions at a concentration of 1000 p.p.m. and each group of tomatoes was soaked for one hour in one of the solutions containing a treatment chemical or in the base solution without chemical. Each tomato in each group was evaluated daily by the following color rating: green (0 points), breaker (1 point), ½ orange (2 points), full orange (3 points), and red ripe (4 points). When all tomatoes in a group are fully ripe the score will be 40 points thus equaling 100%. The daily percent ripeness is recorded below for each treatment (Table VI).

pounds of the invention while still on the vine. For treatment the test compounds were made up in an acetone/water solution at a concentration of 1000 p.p.m. and each test solution was applied thoroughly to a different set of 4 clusters of tomatoes, each cluster having 4 to 6 mature tomatoes. One set of tomatoes was treated with the base solution for control purposes. The results are listed in Table VII below.

TABLE VII

| Treatment | Percent red tomatoes—Days after treatment | | | | |
|---|---|---|---|---|---|
| | 5 days | 8 days | 13 days | 16 days | 19 days |
| Control | 0 | 0 | 5 | 15 | 30 |
| 2-chloroethanesulfinanilide | 42 | 53 | 71 | 89 | 100 |
| N-allyl-2-chloroethanesulfinanilide | 21 | 30 | 3b | 50 | 65 |
| 2-chloroethanesulfinamide | 33 | 46 | 54 | 74 | 74 |
| N-benzyl-2-chloroethanesulfinamide | 8 | 32 | 44 | 60 | 76 |
| N-hexyl-2-chloroethanesulfinamide | 0 | 47 | 36 | 50 | 59 |
| 2,2'-dichloroethanesulfinanilide | 0 | 0 | 6 | 12 | 78 |

Example XVI.—Stimulation of seed germination

Under nomal growing conditions, experience has shown that only 40% of the cocklebur seeds will germinate. Fifty cocklebur seeds were soaked for one hour in either a water/acetone mixture or a water/acetone mixture containing 2-chloroethanesulfinanilide at 1000 p.p.m. w./w. All seeds were planted and allowed to germinate over a two week period. Treatment with the compound of the invention increased seed germination over the control by 25%.

Example XVII.—Leaf epinasty

Leaf epinasty is a hormonal response which occurs in plants wherein the upper side of the leaf stalk grows more rapidly than the lower side causing the leaf to bend downward. To evaluate for leaf epinasty response six week old tomato plants were randomized and segregated into groups of three plants each and each group was sprayed with a different compound of the invention at a concen-

TABLE VI

| Treatment | Percent ripeness—Days after treatment | | | | | | | | | | |
|---|---|---|---|---|---|---|---|---|---|---|---|
| | 1 day | 2 days | 3 days | 4 days | 5 days | 6 days | 7 days | 8 days | 11 days | 14 days | 18 days |
| Control | 0 | 0 | 3 | 5 | 8 | 15 | 28 | 43 | 58 | 85 | 93 |
| 2-chloroethanesulfinamide | 10 | 20 | 35 | 50 | 73 | 88 | 93 | 93 | 93 | 98 | 100 |
| N-methyl-N-phenyl-2-chloroethanesulfinamide | 8 | 15 | 33 | 45 | 60 | 80 | 90 | 95 | 100 | 100 | 100 |
| 2-chloroethanesulfin-3-toluid | 8 | 18 | 30 | 53 | 65 | 78 | 80 | 85 | 95 | 100 | 100 |
| N-octyl-2-chloroethanesulfinamide | 8 | 13 | 35 | 58 | 73 | 83 | 95 | 95 | 100 | 100 | 100 |
| N-allyl-2-chloroethanesulfinamide | 5 | 5 | 25 | 33 | 43 | 73 | 78 | 80 | 85 | 98 | 100 |
| 4'-methoxy-2-chloroethanesulfinanilide | 5 | 10 | 18 | 28 | 43 | 50 | 58 | 68 | 80 | 90 | 100 |
| N-cyclohexyl-2-chloroethanesulfinamide | 5 | 10 | 20 | 43 | 60 | 83 | 93 | 93 | 93 | 98 | 100 |
| 2-chloroethanesulfinanilide | 3 | 5 | 15 | 25 | 43 | 50 | 60 | 75 | 93 | 100 | 100 |
| 2-chloro, $\alpha,\alpha,\alpha$-trifluoroethanesulfin-3-toluidide | 5 | 8 | 18 | 30 | 43 | 55 | 58 | 68 | 90 | 90 | 98 |
| 2,3'-dichloroethanesulfinanilide | 3 | 5 | 13 | 18 | 25 | 30 | 40 | 55 | 78 | 93 | 100 |
| N-hexyl-2-chloroethanesulfinamide | 3 | 15 | 28 | 45 | 70 | 85 | 90 | 95 | 100 | 100 | 100 |
| N-benzyl-2-chlorcethanesulfinamide | 3 | 10 | 15 | 33 | 53 | 70 | 78 | 83 | 93 | 100 | 100 |
| N-isopropyl-2-chloroethanesulfinamide | 3 | 5 | 10 | 23 | 25 | 43 | 50 | 55 | 63 | 73 | 85 |
| N-hexadexyl-2-chloroethanesulfinamide | 3 | 3 | 10 | 18 | 28 | 35 | 55 | 68 | 83 | 98 | 100 |
| N-(2-ethylthioethyl)-2-chloroethanesulfinamide | 3 | 3 | 8 | 15 | 23 | 45 | 55 | 75 | 90 | 100 | 100 |
| N-(2-hydroxyethyl)-2-chloroethanesulfinamide | 0 | 3 | 13 | 18 | 33 | 53 | 68 | 75 | 90 | 100 | 100 |
| N-butyl-2-chloroethanesulfinamide | 0 | 3 | 8 | 18 | 20 | 35 | 40 | 58 | 80 | 85 | 98 |
| N-ethyl-2-chloroethanesulfinamide | 0 | 0 | 5 | 10 | 15 | 35 | 48 | 53 | 78 | 98 | 100 |
| N-hexyl-2-bromoethanesulfinamide | 3 | 8 | 23 | 33 | 68 | 83 | 83 | 83 | 85 | 98 | 100 |
| 2-bromoethanesulfinamide | 3 | 3 | 10 | 18 | 25 | 38 | 45 | 53 | 60 | 85 | 100 |

Example XV.—Fruit ripening

This test was conducted to evaluate the efficacy of the compounds of the invention as ripening agent for mature fruit prior to harvest, i.e., fruit still attached to the growing plant. Individual clusters of mature green cherry tomatoes grown in a greenhouse were treated with the compounds of the invention while still on the vine. For treatment the test compounds were made up in an acetone/water solution at a concentration of 1000 p.p.m. in aqueous solution containing 0.2% tronic surfactant. One unsprayed group was retained for control. The observations of the leaf epinasty which had occurred thirteen days after treatment are recorded in Table VIII below. Evaluation of the degree of leaf epinasty is based on four classifications: no epinasty, indicating normal horizontal leaf growth; complete epinasty (90 degrees), indicating that the leaves grew vertically downward around the stem and; 30 or 60 degrees epinasty, indicating intermediate downward growth of leaves.

including identification of compounds tested are recorded in Table IX below. The table heading "leaves normal after four days" designates visual observation of whether any effects of epinasty remained 4 days after treatment.

TABLE IX

| Treatment | Percent of leaves showing epinasty response | | | | Leaves normal after 4 days | Phyto-toxicity |
| --- | --- | --- | --- | --- | --- | --- |
| | No response | Slight response | Intermediate response | Complete response | | |
| Control | 100 | 0 | 0 | 0 | Yes | None. |
| 2-chloroethanesulfinamide | 0 | 17 | 8 | 75 | No | Moderate.ᵃ |
| 2-chloro-N-methoxyethanesulfinamide | 0 | 50 | 14 | 36 | Yes | None. |
| 2-(methylsulfonyloxy)ethanesulfinamide | 0 | 19 | 15 | 66 | Yes | Do. |
| 2-(methylsulfonyloxy)ethanesulfinanilide | 0 | 24 | 12 | 64 | No | Do. |

ᵃ Moderate phytotoxicity indicates some yellowing of the leaves had occurred.

TABLE VIII

| Compound tested: | Degree of leaf epinasty |
| --- | --- |
| Control | None |
| N-methyl-2-chloroethanesulfinamide | 60 |
| N-isopropyl-2-chloroethanesulfinamide | 60 |
| N-tert-butyl-2-chloroethanesulfinamide | 60 |
| N-sec-butyl-2-chloroethanesulfinamide | 60 |
| N-butyl-2-chloroethanesulfinamide | 30 |
| N-hexyl-2-chloroethanesulfinamide | (1) |
| N-octyl-2-chloroethanesulfinamide | (1) |
| 2-chloroethanesulfinanilide | 60 |
| 2,2'-dichloroethanesulfinanilide | (1) |
| 2,3'-dichloroethanesulfinanilide | (1) |
| 2,4'-dichloroethanesulfinamide | 60 |
| 2-chloro-α,α,α-trifluoroethanesulfin-3-toluidide | 60 |
| 2-chloroethanesulfinamide | (1) |

¹ Complete.

Example XVIII.—Leaf epinasty

A second leaf epinasty test was performed on tomato plants. In this test each compound evaluated was applied as a foliar spray to 3 different tomato plants. Two plants were 37 days old and the third plant was 23 days old. The older plants were 14 inches high with 10 leaves and the younger plants were 10 inches high with 8 leaves. Two ages of plants were included because the older plants usually are more sensitive and give a more rapid hormonal epinasty response. All test compounds were dissolved in acetone and diluted to 2500 p.p.m. with water containing 0.4% surfactant (Wilsco Foamspray). A 10 ml. volume of each compound so diluted was applied as a foliar spray to 3 tomato plants. The treated plants were evaluated for epinasty (bending of leaves downward toward the base of the stem) 20 hours after treatment. The test was again evaluated for epinasty as well as phytotoxicity four days after treatment, to determine if the epinasty effects had dissipated. The results of the test

We claim as our invention:

1. A compound defined by the formula

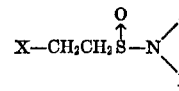

wherein $R^1$ represents hydrogen, alkyl of up to 20 carbon atoms, benzyl, alkenyl of up to 8 carbon atoms, cycloalkyl of up to 8 carbon atoms, alkoxy of up to 4 carbon atoms, the group represented by $R^2Y$ in which $R^2$ is alkylene of up to 4 carbon atoms and Y is hydroxy or alkylthio of up to 3 carbon atoms, or phenyl or a substituted phenyl of the formula

in which Z is alkyl of up to 3 carbon atoms, alkylthio of up to 3 carbon atoms, alkoxy of up to 3 carbon atoms, alkylsulfonyl of up to 3 carbon atoms, chlorine, bromine, nitro or trifluoromethyl; and wherein X is chlorine, bromine or alkylsulfonyloxy wherein the alkyl group contains up to 3 carbon atoms with the proviso that when X is alkylsulfonyloxy $R^1$ is hydrogen, alkyl of up to 6 carbon atoms or phenyl.

2. A compound according to claim 1 wherein X is chlorine.

3. A compound according to claim 2 wherein $R^1$ is hydrogen, alkyl of up to 8 carbon atoms, cycloalkyl of up to 6 carbon atoms, alkenyl of up to 5 carbon atoms, unsubstituted phenyl, phenyl substituted with chlorine, bromine or trifluoromethyl, or benzyl.

4. A compound according to claim 3 wherein $R^1$ is unsubstituted phenyl.

5. A compound according to claim 3 wherein $R^1$ is hydrogen.

References Cited

UNITED STATES PATENTS 3,253,028   5/1966   Louthan _____ 260—551

HARRY I. MOATZ, Primary Examiner

U.S. Cl. X.R.

71—103; 260—456 A